April 8, 1958
P. L. BRIGMON
2,829,394
WINDSHIELD WIPER
Filed April 27, 1956
4 Sheets-Sheet 1
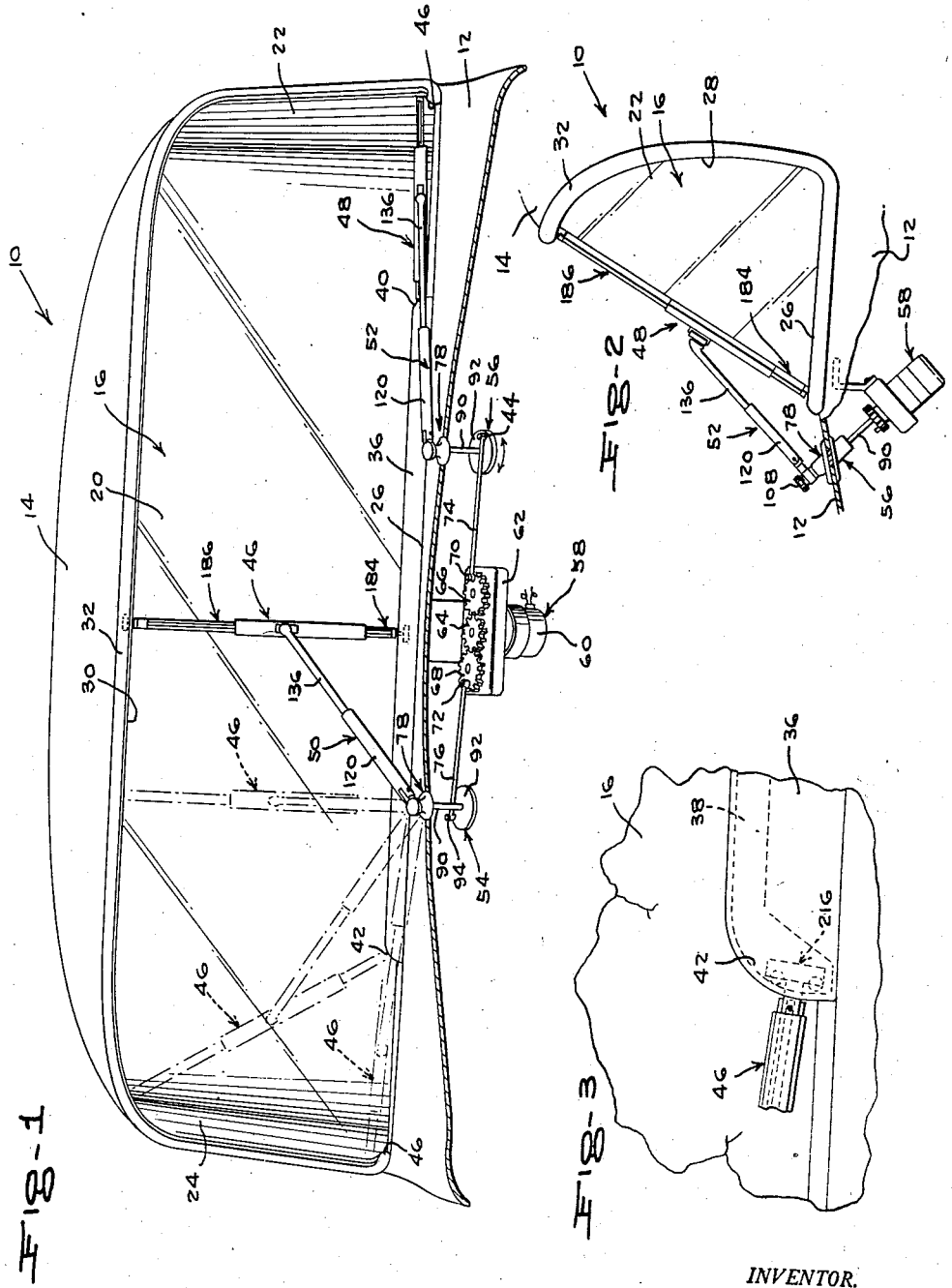
INVENTOR.
PAUL L. BRIGMON
BY
McMorrow, Berman + Davidson
ATTORNEYS April 8, 1958
P. L. BRIGMON
2,829,394
WINDSHIELD WIPER
Filed April 27, 1956
4 Sheets-Sheet 2
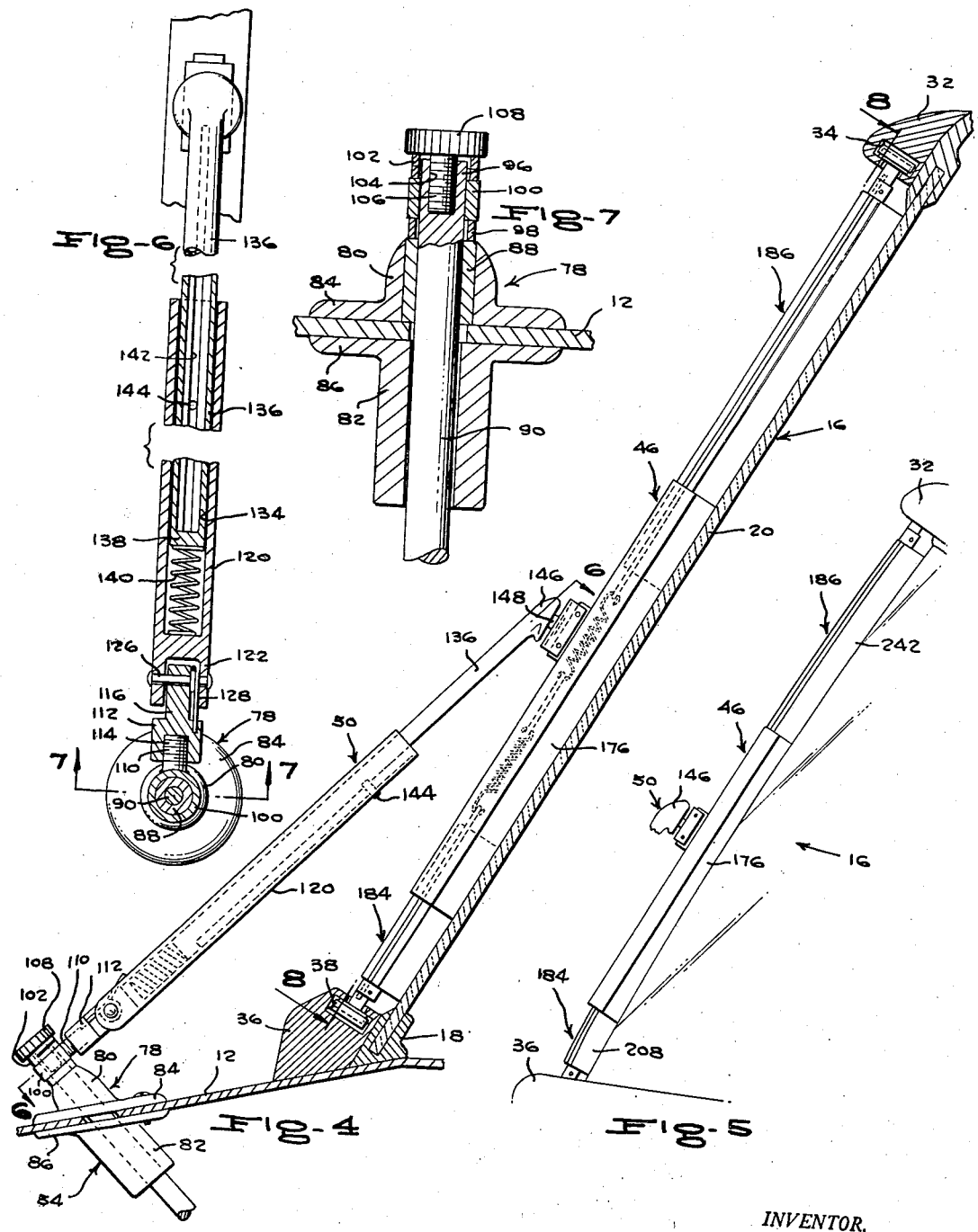
INVENTOR.
PAUL L. BRIGMON
BY
McMorrow, Berman + Davidson
ATTORNEYS

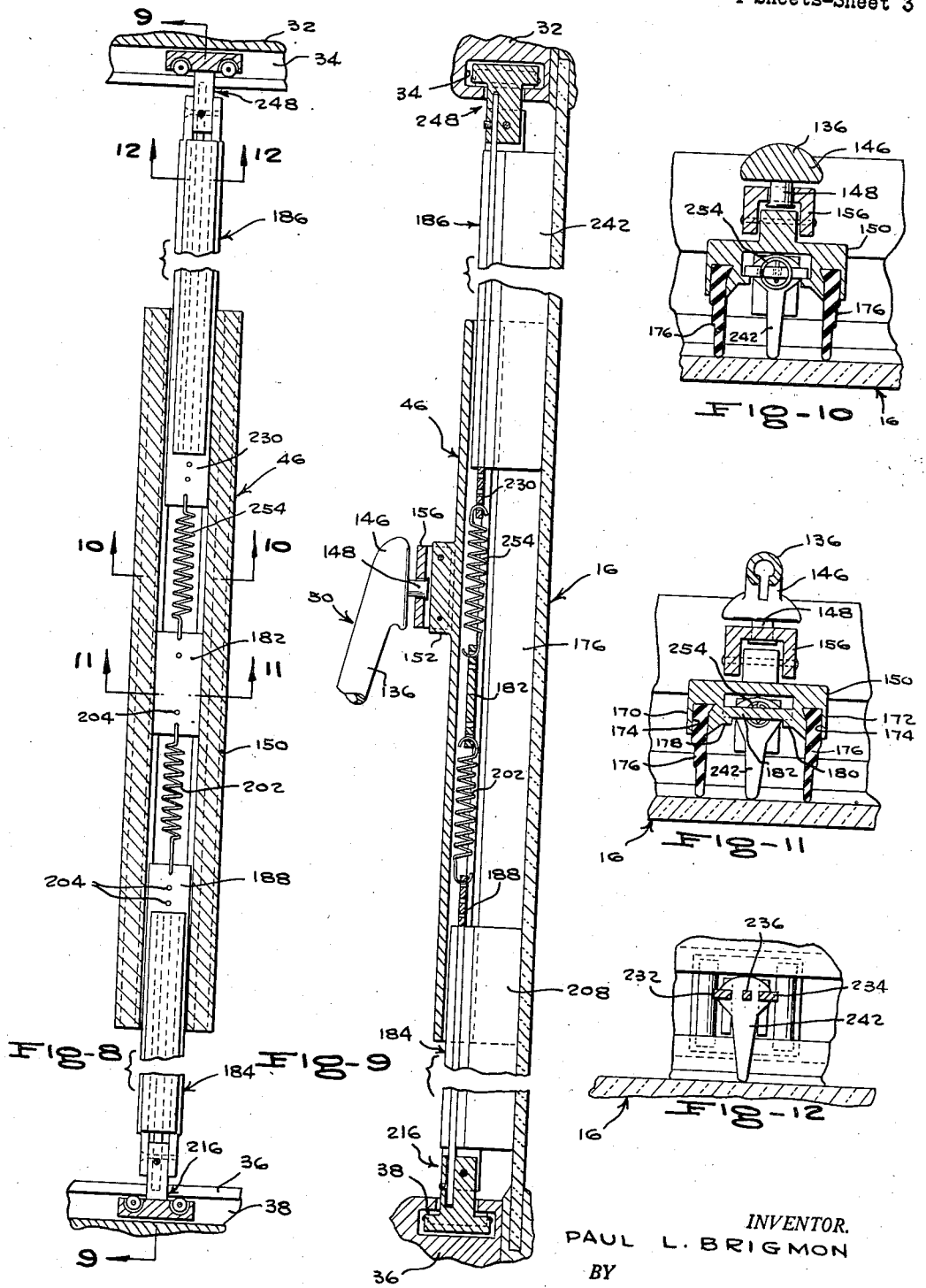

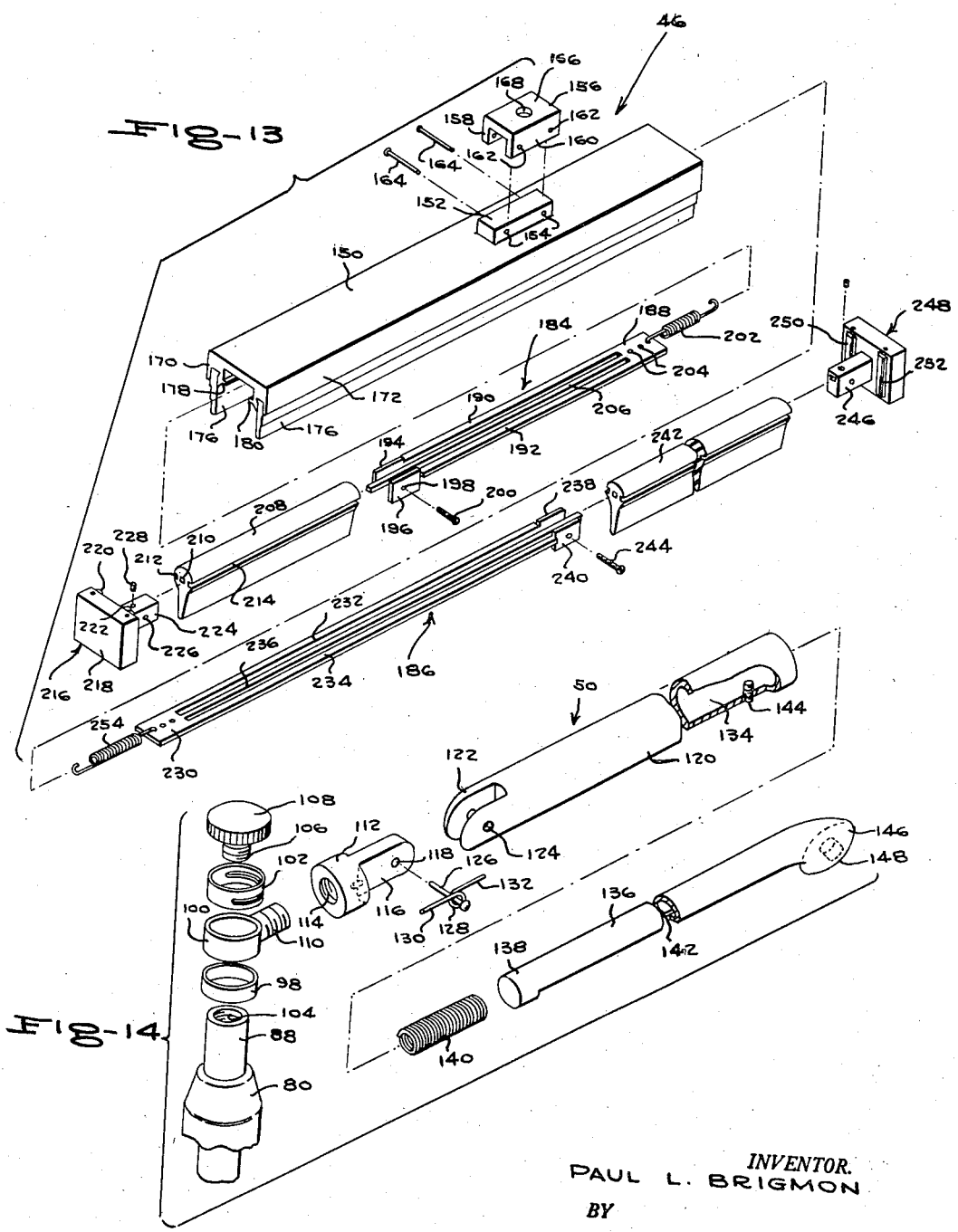

United States Patent Office 2,829,394
Patented Apr. 8, 1958

2,829,394

WINDSHIELD WIPER

Paul L. Brigmon, Cincinnati, Ohio

Application April 27, 1956, Serial No. 581,223

8 Claims. (Cl. 15—255)

This invention relates generally to window cleaning and is more particularly concerned with a novel automatic window wiper for vehicle wrap-around windshields and the like.

Clean windshields on vehicles, especially automotive vehicles, constitute an important factor in reducing accidents caused by impaired operator vision. It is highly desirable to have maximum driver vision at all times with the entire windshield being cleaned and wiped during inclement weather conditions, present windshield wiper assemblies on passenger vehicles, for example, fail to provide this desired quality. Vehicle wrap-around windshields utilized in modern car design, although increasing the operator's range of vision, have complicated the problem of keeping the windshield clean.

A primary object of invention is to provide a novel window wiper combination for vehicle wrap-around windshields and the like including means for wiping the entire outer surface thereof.

A further object of invention in conformance with that set forth is to provide in combination an inclined window pane including curved end portions bounded by a lower horizontal edge and continuing arcuate end edges extending forwardly into a rearwardly disposed upper edge, guide rails bordering the upper and side edges of the window pane and terminating in the lower horizontal edge, a second guide rail bordering the lower horizontal edge of the pane and terminating in arcuate abutment end portions spaced from the terminal ends of the first guide rail, an extensible wiping blade assembly extending between the guide rails in wiping engagement with the window pane including means conforming the assembly to varying curvatures of the window pane, an extendable drive shaft pivotally connected to the blade assembly, and oscillating power means operatively connected to the drive shaft traversing the wiping blade assembly across the window pane in a combined rectilinear and pivotal path of movement across said window pane.

Other objects of invention in conformance with that set forth reside in the combination of a plurality of extensible wiping blade assemblies in conjunction with a window pane of the character set forth including specific details of the drive shaft and wiping blade assembly.

And yet another object of invention in conformance with that set forth is to provide a novel window wiper combination of the character involved which is readily and economically manufactured, easily installed and maintained, and highly practical, serviceable and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary front elevational view of a vehicle incorporating the novel window wiping combination with parts of the vehicle body broken away for clarity, showing in phantom lines various positions assumed by the assembly during operation;

Figure 2 is a side elevational view of Figure 1 with portions broken away for clarity;

Figure 3 is an enlarged fragmentary view of a portion of Figure 1, showing details of a portion of a guide rail and lower portion of the extensible wiping blade assembly;

Figure 4 is an enlarged fragmentary side elevational view similar to Figure 2, with portions broken away and shown in section for clarity;

Figure 5 is a slightly enlarged fragmentary side elevational view similar to Figure 4 showing the manner in which the wiping blade assembly conforms to varying curvatures of the window pane;

Figure 6 is an enlarged sectional view taken substantially on line 6—6 of Figure 5, showing details of the extensible drive shaft of the assembly;

Figure 7 is a further enlarged fragmentary sectional view taken substantially on line 7—7 of Figure 6;

Figure 8 is a further enlarged fragmentary sectional view taken substantially on line 8—8 of Figure 4, showing details of the extensible wiping blade assembly;

Figure 9 is a sectional view taken substantially on line 9—9 of Figure 8;

Figures 10, 11 and 12 are enlarged fragmentary sectional views taken substantially on lines 10—10, 11—11 and 12—12, respectively, of Figure 8;

Figure 13 is an exploded perspective view of the extensible wiping blade assembly of the invention; and Figure 14 is an exploded perspective view of the novel extensible drive shaft of the invention.

Referring to the drawings in detail, indicated generally at 10 is a fragmentary portion of a vehicle, such as a passenger car, said vehicle including between the hood portion 12 and top 14 a window pane or windshield indicated generally at 16, said window pane being secured at its outer periphery in a suitable mounting frame 18, see Figure 4, for example.

The window pane 16 is rearwardly inclined as clearly seen in Figure 2, for example, including a central body portion 20 terminating in curved side portions 22 and 24, including a substantially horizontal lower edge 26 bordering the central portion and side portions 20 through 24, and continuing as a vertically extending forwardly directed arcuate end edge portion 28, see Figure 2, which extends into the upper edge portion 30 which is rearwardly disposed relative to the lower horizontal edge 26.

Suitably secured and formed of any suitable material is a first guide track 32 which extends in bordering relationship along the upper edge of the window pane continuing along the arcuate end edges 28 of said window pane, see Figure 2, and extending forwardly along the lower horizontal edge of said window pane and terminating thereat so that the first guide rail extends around the side portions 22 and 24 of the window pane and across the upper edge thereof. The guide rail 32 includes therein a substantially T-shaped groove portion 34, see Figure 4, which opens toward the surface of the window pane for a purpose to subsequently become apparent.

A second guide rail 36, see Figure 1, is suitably secured on the mounting frame 18, see Figure 4, said second guide rail 36 including therein a substantially T-shaped groove or slot portion 38 opening toward the upper edge of the window pane, said second guide rail terminating in arcuate abutment end portions 40 and 42 terminating in spaced relationship from the ends 44 and 45 of the first guide rail, and as clearly seen in Figure 3 the groove or slot portion 38 will define the pivotal path of the lower end portion of an extensible wiping blade assembly indicated generally at 46 to subsequently be described in detail. Although the exemplary embodiment of invention discloses plural wiping blade assemblies indicated generally at 46 and 48, this invention may utilize a single extensible wiping blade assembly, each of which being of a similar character thus only one of the extensible wiping blade assemblies will be described in detail.

The extensible wiping blade assemblies 46 and 48 are operatively connected to extensible drive shafts 50 and 52, respectively, which are of a similar character, each of which being operatively connected to oscillating power means indicated generally at 54 and 56, respectively, driven by a suitable common power source indicated generally at 58.

The power means 58 may be constituted by a suitable electrical motor 60 connected by suitable leads to suitable switch mechanism located in the vehicle. The electric motor 60 is connected by means of suitable gear reduction mechanism 62 which has a drive gear 64 extending therefrom. Intermeshed on opposite sides of the drive gear 64 in rotatably supported relationship on the gear reduction box 62 are oppositely disposed driven gear elements 66 and 68 which include in upwardly extending relationship from their axis of rotation support pins 70 and 72, respectively, which are pivotally connected to one end of a pitman-type connecting link 74 and 76, respectively.

Extending angularly through the hood portion 12 of the vehicle in substantially parallel alignment to the axis of rotation of the gears 64 through 68 are support sleeve assemblies indicated generally at 78 which may comprise suitably conformed aligned internally bored tubular members 80 and 82 including annular flange portions 84 and 86, respectively, suitably secured on respective upper and lower surface portions of the vehicle hood 12, the tubular portion 80 having inserted therein, if desired, suitable bushing sleeve 88, see Figure 7, and journaled through the elements 80 and 82 is an oscillating power shaft 90. The shafts 90 have suitably secured on their lower ends support plate elements 92, see Figure 1, having extending from an upper surface thereof in spaced relationship from the shafts 90 a mounting pin element 94, one of each being pivotally connected to an end portion of the pitman-type rod 74, 76, thus when the drive gear 64 is rotated opposite rotation results in the driven gears 66 and 68 and by virtue of the offset relationship of the pins 70 and 72 and pins 94 oscilating movement results whereby the shafts 90 are oscillated wherein the wiping blade assemblies 46 and 48 will sequentially be traversed across the window pane 16 as will subsequently be described in detail.

As seen in Figure 7, the upper end portion 96 of the shafts extend out of the sleeve 88 and have circumposed thereabout in engagement with the upper end of the sleeve 88 a suitable bushing or collar 98 of bronze or any other suitable bearing material and in engagement with the upper end thereof is a mounting collar 100 the upper edge thereof being engaged by a compressible spring collar 102, and the upper end of the shaft 90 has an internally threaded bore portion 104 receiving therein the threaded end 106 of a clamp screw 108 having an enlarged head portion which clampingly engages collar 102, and thus rotation of the shafts 90 results in rotation of the mounting collar 100. The mounting collar 100 has extending laterally from the side portion thereof externally threaded mounting stud 110, see Figures 6 and 14, providing means for supporting the extensible drive shafts thereon. The drive shafts 50 and 52 each include a mounting hub element 112 including an internally threaded end portion 114 received on the stud 110 of the mounting collar, said mounting element including an elongated mounting tongue portion 116 having a transverse bore 118 extending therethrough. The extensible drive shafts 50 and 52 include a first or lower elongated sleeve member 120 which includes a bifurcated lower end portion 122 transversely bored at 124, see Figure 14, for alignment with the previously mentioned transverse bore 118, the bore portions 118 and 124 receiving therein a pivot pin element 126, said pin 126 having circumposed thereabout between portion 116 of the mounting hub 112 and the bifurcated portion of the sleeve 120 a central portion of a hairpin spring 128 which includes leg portions 130 and 132 engageable with upper surface portions of the mounting hub 112 and tubular sleeve 120 for urging the drive shaft toward the outer surface of the window pane 16. The sleeve 120 has extending longitudinally therein a bore portion 134 which telescopically receives a rod member 136 therein, the lower end portion 138 thereof being in engagement with a compression spring element 140 disposed in the bore portion 134 of the sleeve 120. The rod 136 has extending into its outer periphery a longitudinally extending groove portion 142 which receives therein a stop or abutment screw element 144 extending transversely into a side portion of the sleeve 120, the screw 144 being effective with the groove 142 to limit movement of the rod 136 away from the sleeve 120, however, sufficient telescoping movement will be permitted between the sleeve 120 and rod 136 to permit the extensible wiping blade assemblies to traverse the entire window pane so that the entire outer surface may be wiped as will subsequently be described in detail. The rod members 136 include an angular end portion 146 having extending therefrom a stub shaft axle element 148 which will provide a pivotal connection to the wiping blade assemblies.

The wiping blade assemblies 46 and 48 each include an elongated housing portion 150 having suitably secured at an upper surface portion thereof a mounting block 152 having spaced transverse bore portions 154 extending therethrough, see Figure 13, and a mounting cap element 156 having oppositely disposed parallel side flanges 158 and 160 for disposition on opposite sides of the block element 152, said flanges 158 and 160 have suitable transverse aligned aperture portions 162 extending therethrough for alignment with the previously mentioned bore portions 154 and suitable mounting pins 164 will extend through the aligned portions 162 and 154. The mounting cap element 156 includes a transverse web portion 166 extending across the upper ends of the flanges 158 and 160, said web 166 having a transverse bore portion 168 extending therethrough which pivotally receives therein the previously mentioned stub shaft 148 of rod 136, said stub shaft 148 being upset at its lower end, if desired, to prevent the accidental removal of the drive shaft from the mounting cap element. Although not shown, shaft 148 may be internally bored for receiving a suitable retaining screw element therein to replace the upset portion of the shaft 148.

The housing portion 150 includes a pair of oppositely disposed flange portions 170 and 172 which have extending in the lower edge portion thereof a groove portion 174 receiving therein elongated wiper blade elements 176 of rubber or any other suitable material for wipingly engaging the outer surface of the window pane. The flanges 170 and 172 include inwardly directed rib portions 178 and 180, respectively, see Figures 10 and 11, for example, defining a downwardly opening substantially T-shaped groove and extending transversely therebetween in an intermediate portion thereof in fixedly secured relationship thereto is a mounting plate 182, see Figures 8, 9 and 11, for example.

Reciprocably and resiliently received in longitudinally extending relationship from opposite ends of the housing portion 150 between that portion thereof defined by the ribs 178 and 180 are wiping blade segments indicated generally at 184 and 186. As clearly seen in Figure 13, blade segment 184 includes a mounting plate 188 including a pair of longitudinally extending leg portions 190 and 192 terminating in right-angularly disposed foot elements 194 and 196, respectively, which have extending therethrough transverse aperture portions 198

(only one being shown in the foot portion 196) for receiving therein a lock screw element 200. The mounting plate 188 has secured at its other end, one end of a tension spring element 202, the other end of said spring being suitably secured to the previously mentioned transverse plate 182 secured in the housing portion 150. The plate 182 and mounting plate 188 may have a plurality of spaced apertures 204 extending therethrough for the purpose of providing means for obtaining a rough adjustment of the tension on the spring 202. Extending longitudinally between the leg portions 190 and 192 of the mounting plate 188 and integral therewith is an elongated mounting strip element 206 which extends beyond the ends of the foot elements 194. An elongated wiper blade element 208 has a longitudinally extending bore portion 210 which conforms to the outer configuration of the element 206, said element 206 extending therethrough, said blade element 208 includes on opposite sides of the bore 210 longitudinally extending groove portions 212 and 214 which are slidably received on the respective leg portions 190 and 192. Secured to the foot elements 194 and 196 and the end of element 206 is a friction reducing roller assembly 216 which includes a mounting block 218 which is received within the groove 38 of the guide track 36, said block 218 rotatably supporting spaced roller elements 220 and 222. The block element 218 has extending integrally therefrom between the roller elements 220 and 222 a mounting shaft element 224 including a transverse bore portion 226 therethrough, see Figure 13, the foot elements 194 and 196 being disposed on opposite sides of said mounting shaft 224 with the apertures 198 thereof in alignment with the apertures 226 and the screw element 200 extends therethrough for retaining the roller assembly 216 in fixed position thereon. The mounting shaft 224 includes a longitudinally extending bore portion therein which receives the end portion of the strip element 206 and a suitable set screw element 228 extends through a suitable bore portion in said mounting shaft for engagement on the upper surface of said strip element 206.

The blade segment 186 includes a mounting plate 230, also seen in Figure 13, including the leg portions 232 and 234 and has extending integrally between the leg portions 232 and 234 a mounting strip element 236, leg elements 232 and 234 terminate in foot elements 238 and 240, respectively, and a wiping blade element 242 similar to wiping blade element 208 is received on the mounting plate in a manner similar to that described relative to wiping blade segment 184, being retained thereon by means of the screw element 244 extending through aligned aperture portions in the foot elements 238 and 240 disposed on opposite sides of a mounting shaft 246 extending through a transverse aperture portion therein. The mounting shaft 246 comprises an integral part of a second roller element indicated generally at 248 which includes suitably journaled space roller elements 250 and 252 disposed in the groove 34 of the guide rail 32. The mounting plate 230 has secured thereto one end of a tension spring 254, the other end of which being suitably secured to the fixed plate 182, see Figures 8 and 9, for example.

Thus when the roller assembly 216 and assembly 248 are disposed within the guide rails 36 and 32, respectively, the tension spring element 202 and 254 will urge the blade segments 184 and 186 toward each other conforming to the various distances across the window pane which are traversed by the extensible wiping blade assemblies, the blade segments 184 and 186 are constructed of a suitable resilient material, spring steel or the like, and as the curvature of the window pane of the windshield changes the blade segments will conform to said curvature, see Figure 5 for example, the wiping blade elements 208 and 242 being of a suitable resilient material, such as natural rubber, etc. thus conforming or also permitting conformation of the extensible assembly to the varying curvatures of the window pane, it will be noted that the inner ends of the wiping blade elements 208 and 242 are in overlapping relationship relative to the wiping blade elements 176 on the housing portion 150 thus insuring complete wiping of the outer surface portion of said window pane.

Considering Figure 1, as the drive shafts 48 and 50 are oscillated as previously mentioned, the wiping blade assemblies 46 and 48, respectively, will alternately assume the positions shown by the phantom lines in Figure 1 i. e. the drive shafts being operable to traverse the wiping blade assemblies in a rectilinear movement across the outer surface of the window pane until the roller portion 216 of the wiping blade assembly engages an arcuate abutment end of the guide track 36 whereafter continued movement of the drive shaft member 50 toward the left will result in a pivotal movement of the wiping blade assembly 46, this movement also occurring relative to the wiping blade assembly 48, thus disposing the wiping blade assemblies toward a substantially horizontal position relative to the lower horizontal edge of the window pane.

Thus there has been disclosed a novel window wiping combination that fully conforms with the objects of invention heretofore set forth.

Various positional directional terms such as "upper," "lower," and "outer," utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, an extensible wiping blade assembly extending between the first and second guide rails in wiping engagement with the outer surface of the window pane and including means conforming to varying curvatures of the window pane, an extensible drive shaft assembly pivotally connected at one end to a portion of the wiping blade assembly, and oscillating power means operatively connected to the other end of said drive shaft assembly traversing the wiping blade assembly across the outer surface of the window pane in a combined rectilinear and pivotal path of movement as the lower end of the wiping blade assembly moves along the second guide rail and into and out of engagement with the arcuate abutment end portions thereof.

2. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, a pair of extensible wiping blade assemblies extending between the first and second guide rails in wiping engagement with the outer surface of the window pane and including means conforming to varying curvatures of the window pane, extensible drive shaft assemblies pivotally connected at one end to a portion of a wiping blade assembly, and oscillating power means operatively connected to the other end of said drive shaft assemblies traversing the wiping blade assemblies across the outer surface of the window pane in a combined rectilinear and pivotal path of movement as the lower end of the wiping blade assemblies move along the second guide rail and into and out of engagement with the arcuate abutment end portions thereof.

3. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, an extensible wiping blade assembly extending between the first and second guide rails in wiping engagement with the outer surface of the window pane and including means conforming to varying curvatures of the window pane, an extensible drive shaft assembly pivotally connected at one end of a portion of the wiping blade assembly, and oscillating power means operatively connected to the other end of said drive shaft assembly traversing the wiping blade assembly across the outer surface of the window pane in a combined rectilinear and pivotal path of movement as the lower end of the wiping blade assembly moves along the second guide rail and into and out of engagement with the arcuate abutment end portions thereof, said extensible wiping blade assembly including an elongated housing portion including longitudinally extending wiping blade means, the drive shaft being pivotally connected to said housing portion, wiping blade segments extending longitudinally from opposite ends of the housing portion and including means permitting resiliently urged reciprocable and lateral movement therein permitting the blade assembly to conform to varying curved surfaces of the window pane being traversed.

4. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, a pair of extensible wiping blade assemblies extending between the first and second guide rails in wiping engagement with the outer surface of the window pane and including means conforming to varying curvatures of the window pane, extensible drive shaft assemblies pivotally connected at one end to a portion of a wiping blade assembly, and oscillating power means operatively connected to the other end of said drive shaft assemblies traversing the wiping blade assemblies across the outer surface of the window pane in a combined rectilinear and pivotal path of movement as the lower end of the wiping blade assemblies move along the second guide rail and into and out of engagement with the arcuate abutment end portions thereof, said extensible wiping blade assemblies including an elongated housing portion including longitudinally extending wiping blade means, the drive shaft being pivotally connected to said housing portion, wiping blade segments extending longitudinally from opposite ends of the housing portion and including means permitting resiliently urged reciprocable and lateral movement therein permitting the blade assemblies to conform to varying curved surfaces of the window pane being traversed.

5. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, an extensible wiping blade assembly extending between the first and second guide rails in wiping engagement with the outer surface of the window pane and including means conforming to varying curvatures of the window pane, an extensible drive shaft assembly pivotally connected at one end to a portion of the wiping blade assembly, and oscillating power drive means operatively connected to the other end of said drive shaft assembly traversing the wiping blade assembly across the outer surface of the window pane in a combined rectilinear and pivotal path of movement as the lower end of the wiping blade assembly moves along the second guide rail and into and out of engagement with the arcuate abutment end portions thereof, said extensible drive shaft including a pair of telescopically engaged rod members, compression spring means extending between adjacent end portions of the rod members urging them apart toward extended relationship, one of said rod members being pivotally connected to the wiping blade assembly, the other rod member being pivotally connected to the oscillating power means about a pivot axis disposed at ninety degrees to the pivotal connection of the one rod member with the wiping blade assembly, and spring means extending between the power means and other rod member urging the drive shaft toward the outer surface of the window pane.

6. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, a pair of extensible wiping blade assemblies extending between the first and second guide rails in wiping engagement with the outer surface of the window pane and including means conforming to varying curvatures of the window pane, extensible drive shaft assemblies pivotally connected at one end to a portion of a wiping blade assembly, and oscillating power means operatively connected to the other end of said drive shaft assemblies traversing the wiping blade assemblies across the outer surface of the window pane in a combined rectilinear and pivotal path of movement as the lower end of the wiping blade assemblies move along the second guide rail and into and out of engagement with the arcuate abutment end portions thereof, said extensible drive shafts including a pair of telescopically engaged rod members, compression spring means extending between adjacent end portions of the rod members urging them apart toward extended relationship, one of said rod members being pivotally connected to the wiping blade assembly, the other rod member being pivotally connected to the oscillating power means about a pivot axis disposed at ninety degrees to the pivotal connection of the one rod member with the wiping blade assembly, and spring means extending between the power means and other rod member urging the drive shaft toward the outer surface of the window pane.

7. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, an extensible wiping blade assembly extending between the first and second guide rails in wiping engagement with the outer surface of the window pane and including means conforming to varying curvatures of the window pane, an extensible drive shaft assembly pivotally connected at one end of a portion of the wiping blade assembly, and oscillating power means operatively connected to the other end of said drive shaft assembly traversing the wiping blade assembly across the outer surface of the window pane in a combined rectilinear and pivotal path of movement as the lower end of the wiping blade assembly moves along the second guide rail and into and out of engagement with the arcuate abutment end portions thereof, said extensible wiping blade assembly including an elongated housing portion including longitudinally extending wiping blade means, the drive shaft being pivotally connected to said housing portion, wiping blade segments extending longitudinally from opposite ends of the housing portion and including means permitting resiliently urged reciprocable and lateral movement therein permitting the blade assembly to conform to varying curved surfaces of the window pane being traversed, the wiping blade segments including elongated support blade elements of a resilient material reciprocably supported in the housing portion, tension springs anchored in said housing portion in engagement with inner end portions of the support plate elements urging them toward each other, said plate elements including longitudinally extending portions terminating outside of said housing portion, roller means secured on an end portion of said elongated elements in sliding engagement with one of the guide rails, and wiping blade elements supported on said elongated elements and including an inner end portion in overlapping relationship to the wiping blade means of the housing portion.

8. In combination an inclined window pane for vehicle wrap-around windshields and the like comprising a central rearwardly inclined pane portion terminating in curved end portions extending rearwardly away from the central portion, a lower horizontal edge extending along the central and curved end portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane, a second guide rail bordering the lower horizontal edge of the pane and including arcuate abutment end portions in spaced relation from opposite terminal ends of the first guide rail, a pair of extensible wiping blade assemblies extending between the first and second guide rails in wiping engagement with the outer surface of the window pane and including means conforming to varying curvatures of the window pane, extensible drive shaft assemblies pivotally connected at one end to a portion of a wiping blade assembly, and oscillating power means operatively connected to the other end of said drive shaft assemblies traversing the wiping blade assemblies across the outer surface of the window pane in a combined rectilinear and pivotal path of movement as the lower end of the wiping blade assemblies move along the second guide rail and into and out of engagement with the arcuate abutment end portions thereof, said extensible wiping blade assemblies including an elongated housing portion including longitudinally extending wiping blade means, the drive shaft being pivotally connected to said housing portion, wiping blade segments extending logitudinally from opposite ends of the housing portion and including means permitting resiliently urged reciprocable and lateral movement therein permitting the blade assemblies to conform to varying curved surfaces of the window pane being traversed, the wiping blade segments including elongated support blade elements of a reislient material reciprocably supported in the housing portion, tension springs anchored in said housing portion in engagement with inner end portions of the support plate elements urging them toward each other, said plate elements including longitudinally extending portions terminating outside of said housing portion, roller means secured on an end portion of said elongated elements in sliding engagement with one of the guide rails, and wiping blade elements supported on said elongated elements and including an inner end portion in overlapping relationship to the wiping blade means of the housing portion.

References Cited in the file of this patent

UNITED STATES PATENTS

| | | |
|---|---|---|
| 860,021 | Fesenfeld | July 16, 1907 |
| 2,615,190 | Shaw | Oct. 28, 1952 |

FOREIGN PATENTS

| | | |
|---|---|---|
| 662,718 | Germany | June 23, 1938 |